(12) United States Patent  
Hashimoto et al.

(10) Patent No.: US 8,041,123 B2  
(45) Date of Patent: Oct. 18, 2011

(54) TEMPLATE MATCHING PROCESSING APPARATUS AND METHOD, HOLOGRAM REPRODUCING APPARATUS AND METHOD, AND COMPUTER PROGRAM

(75) Inventors: Michikazu Hashimoto, Saitama (JP); Kiyoshi Tateishi, Saitama (JP)

(73) Assignee: Pioneer Corporation, Tokyo (JP)

( * ) Notice: Subject to any disclaimer, the term of this patent is extended or adjusted under 35 U.S.C. 154(b) by 1008 days.

(21) Appl. No.: 11/885,591

(22) PCT Filed: Mar. 3, 2006

(86) PCT No.: PCT/JP2006/304056
§ 371 (c)(1),
(2), (4) Date: Nov. 13, 2007

(87) PCT Pub. No.: WO2006/093254
PCT Pub. Date: Sep. 8, 2006

(65) Prior Publication Data
US 2008/0166056 A1    Jul. 10, 2008

(30) Foreign Application Priority Data

Mar. 3, 2005 (JP) .................................. 2005-059464

(51) Int. Cl.
*G06K 9/62* (2006.01)
(52) U.S. Cl. ......................................................... 382/209

(58) Field of Classification Search .................. None
See application file for complete search history.

(56) References Cited

FOREIGN PATENT DOCUMENTS

| JP | 62-211048 | 9/1987 |
| JP | 02-213706 | 8/1990 |
| JP | 05-120436 | 5/1993 |
| JP | 05-312543 | 11/1993 |
| JP | 07-044948 | 2/1995 |
| JP | 07-200828 | 8/1995 |
| JP | 10-124666 | 5/1998 |
| JP | 2001-174216 | 6/2001 |
| JP | 2001-195597 | 7/2001 |
| JP | 2004-310957 | 11/2004 |

OTHER PUBLICATIONS

International Search Report for PCT/JP2006/304056 mailed May 16, 2006.

*Primary Examiner* — Samir Ahmed
*Assistant Examiner* — Fred Hu
(74) *Attorney, Agent, or Firm* — Nixon & Vanderhye P.C.

(57) ABSTRACT

A template matching processing device includes: first calculation means for calculating a plurality of correlation values indicating the correlation between an inputted detection image and a predetermined template image for each pixel unit while shifting the template image with respect to the detection image in pixel unit; and second calculation means for calculation coordinate position of the detection image according to the coordinate position of the center of gravity of the correlation values.

12 Claims, 12 Drawing Sheets

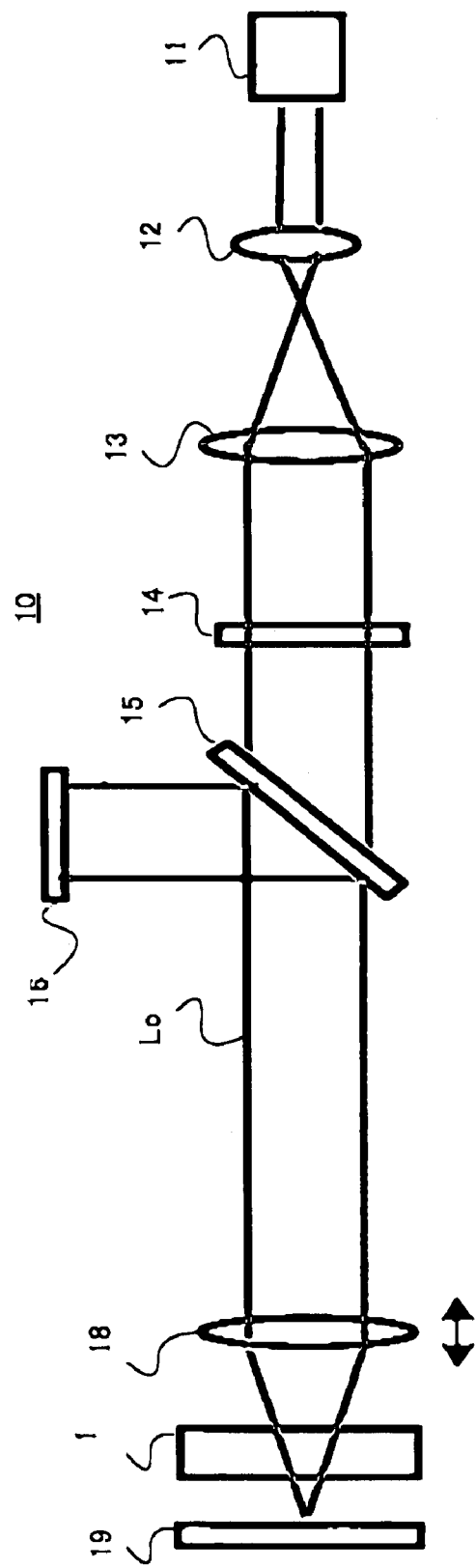
[FIG. 1]

[FIG. 2]
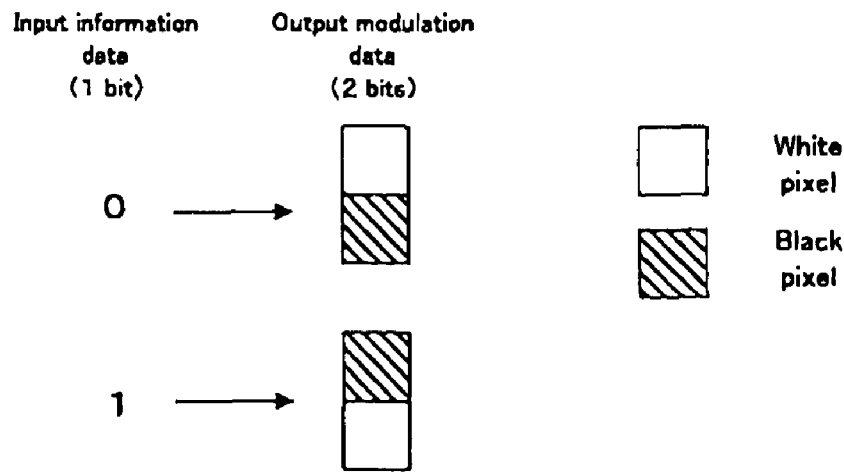
(a)
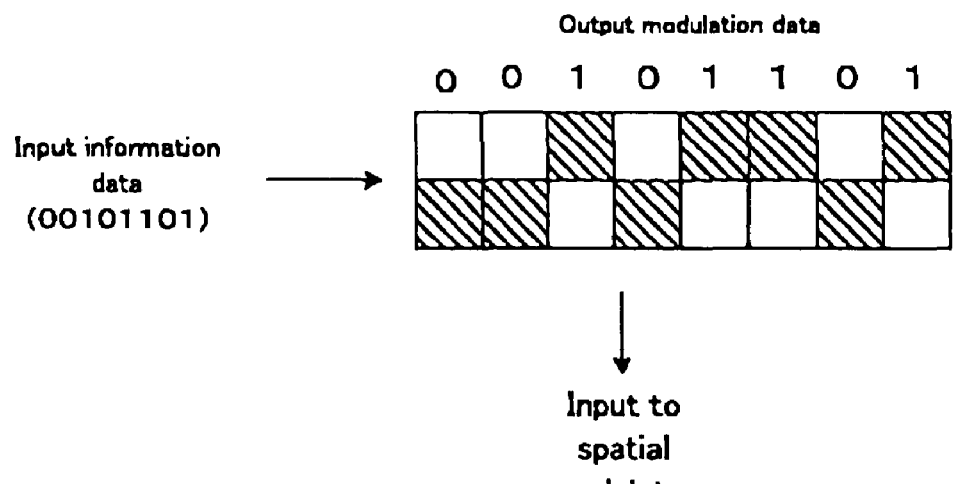
(b)

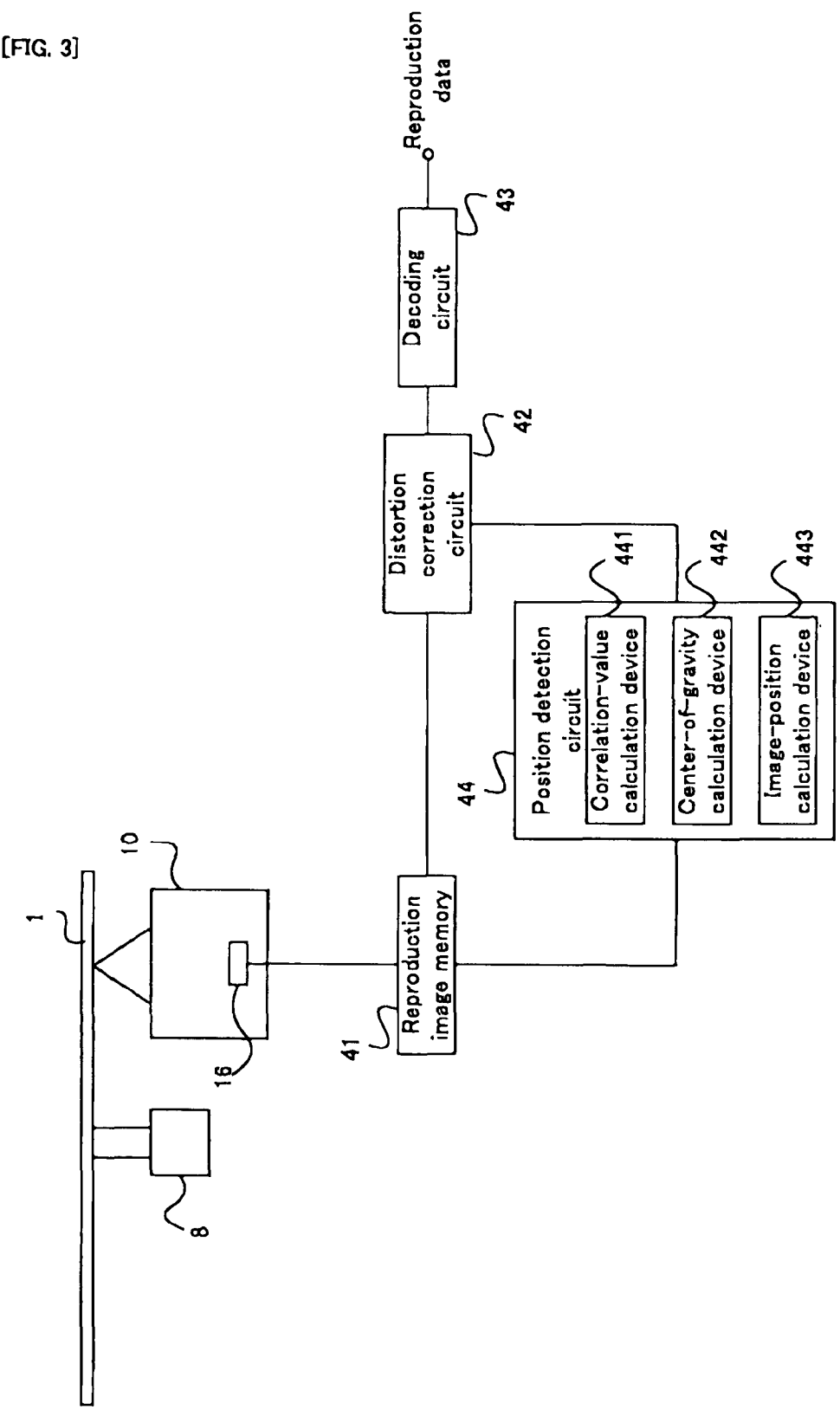
[FIG. 3]

[FIG. 4]
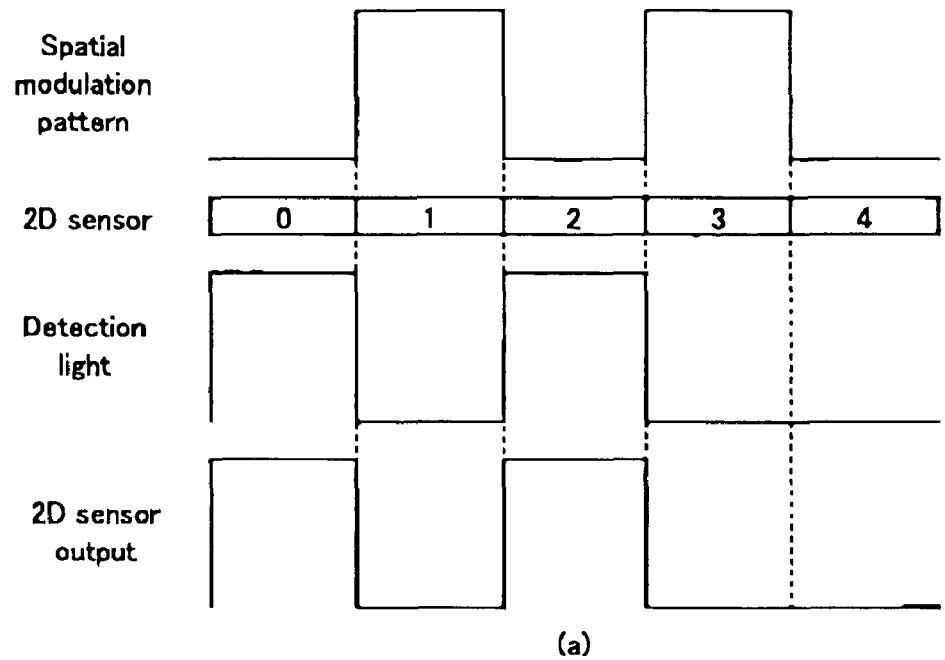
(a)
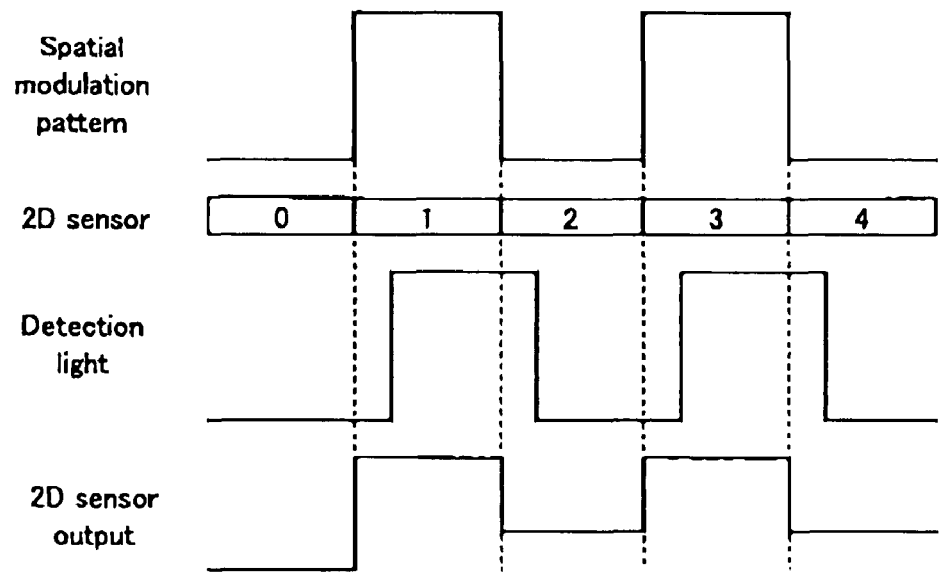
(b)

[FIG. 5]
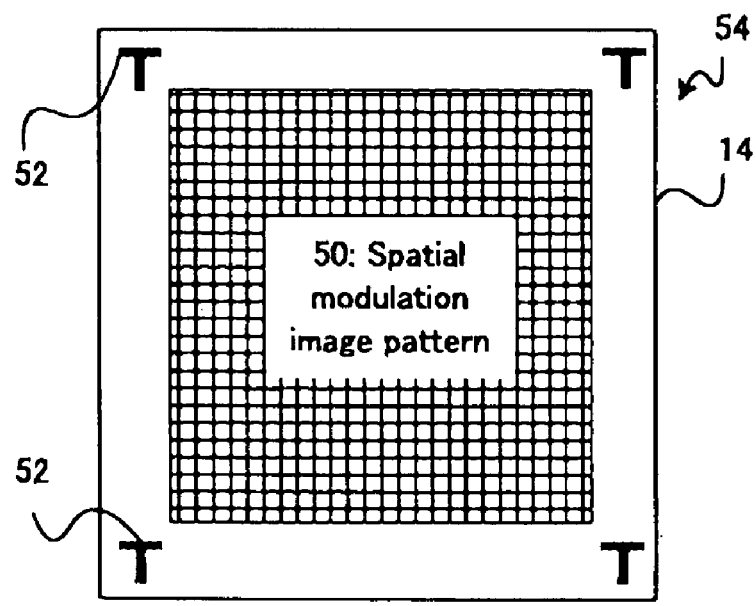

[FIG. 6]
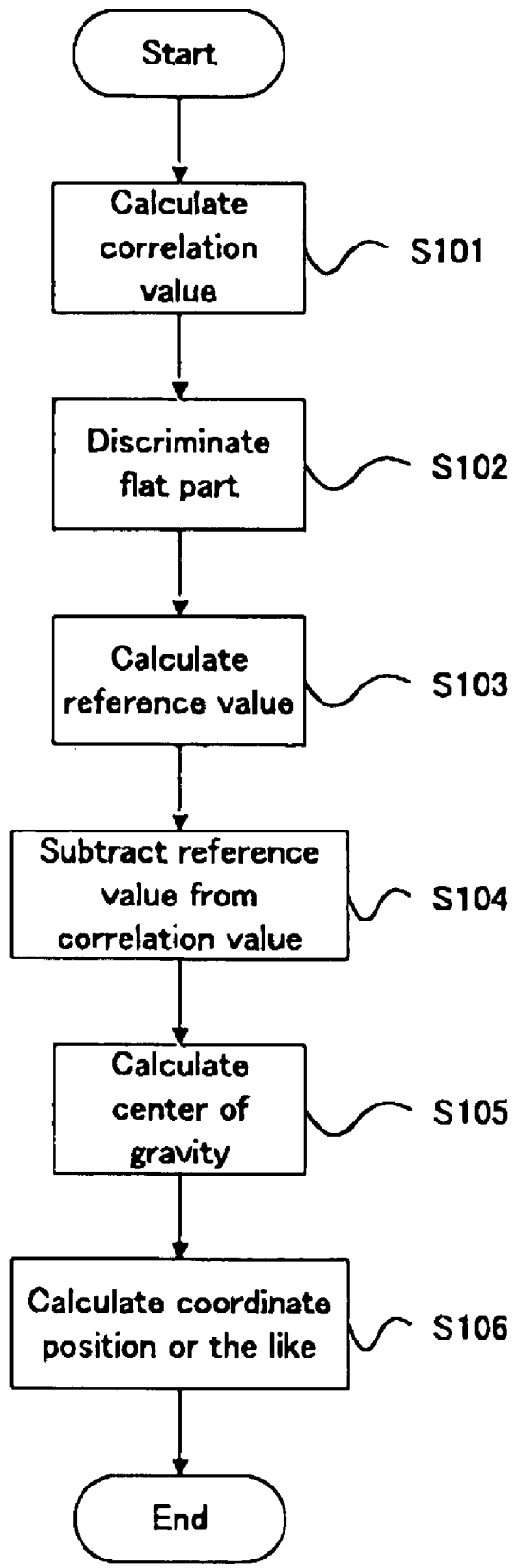

[FIG. 7]
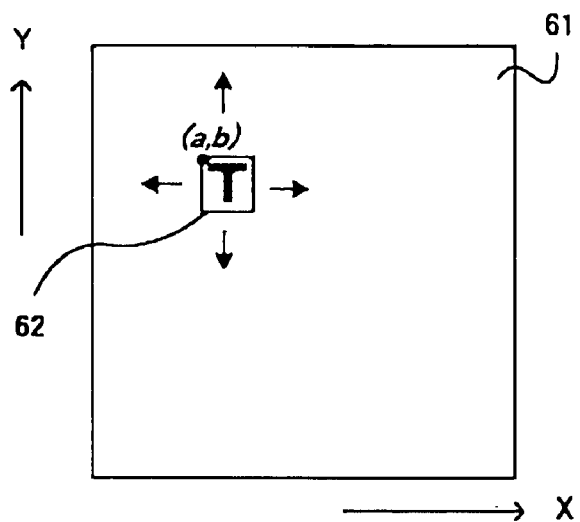
[FIG. 8]
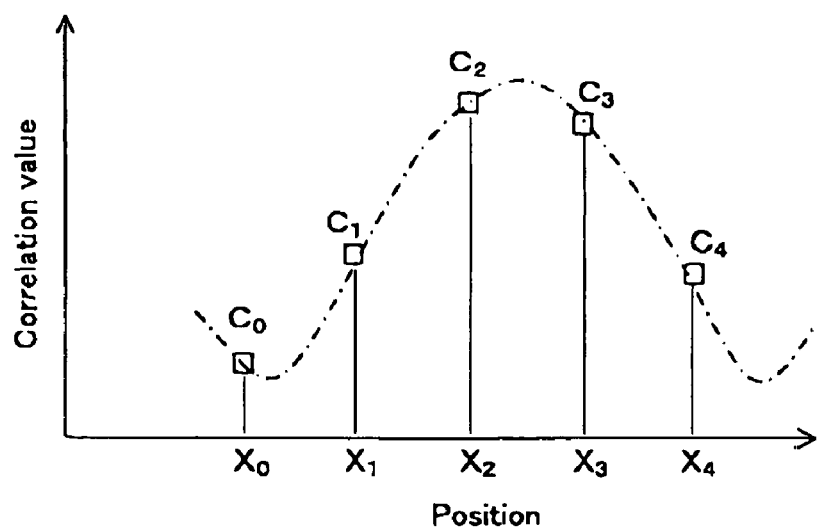

[FIG. 9]
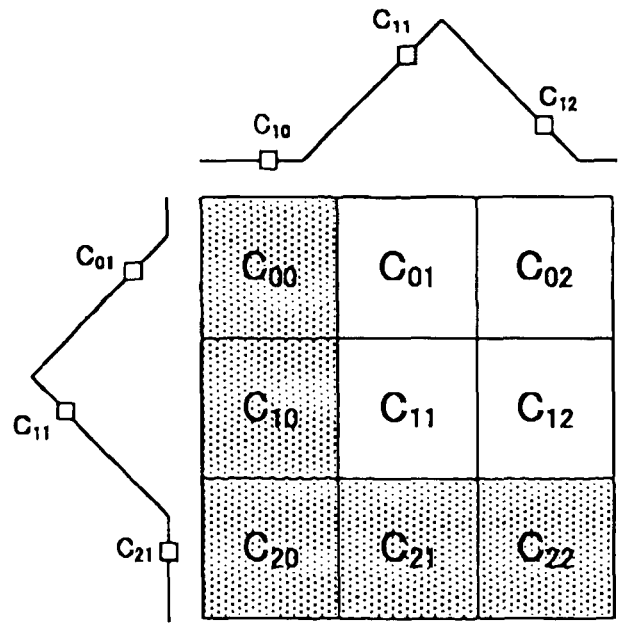
[FIG. 10]
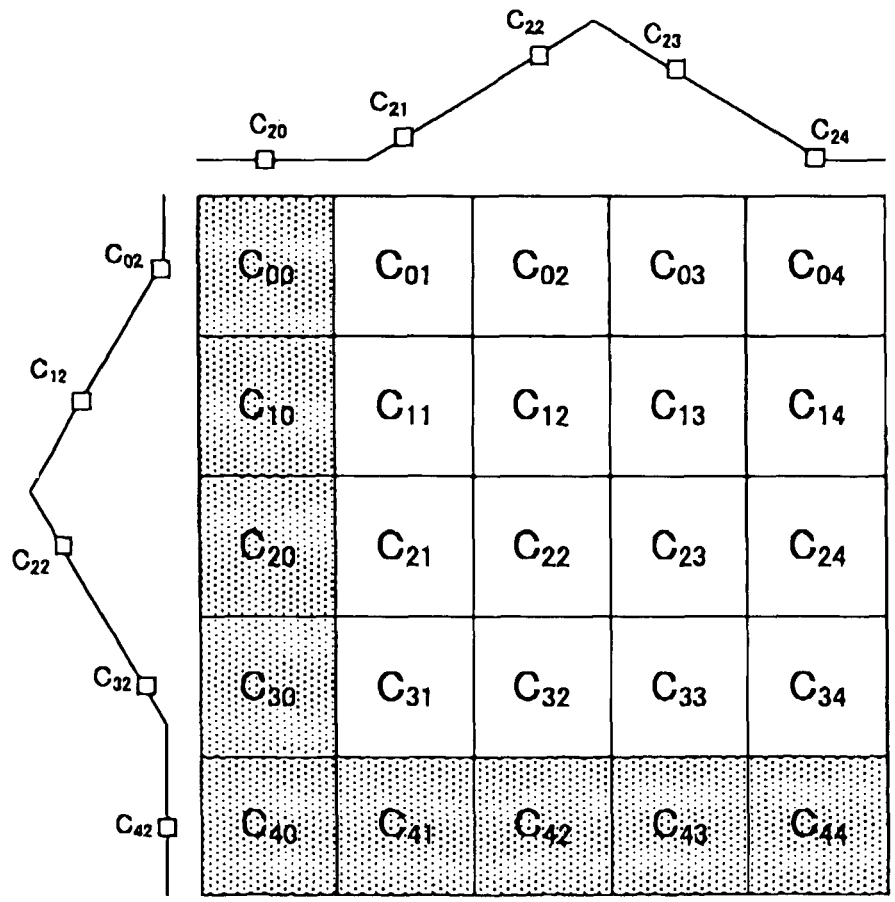

[FIG. 11]
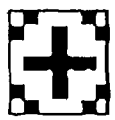
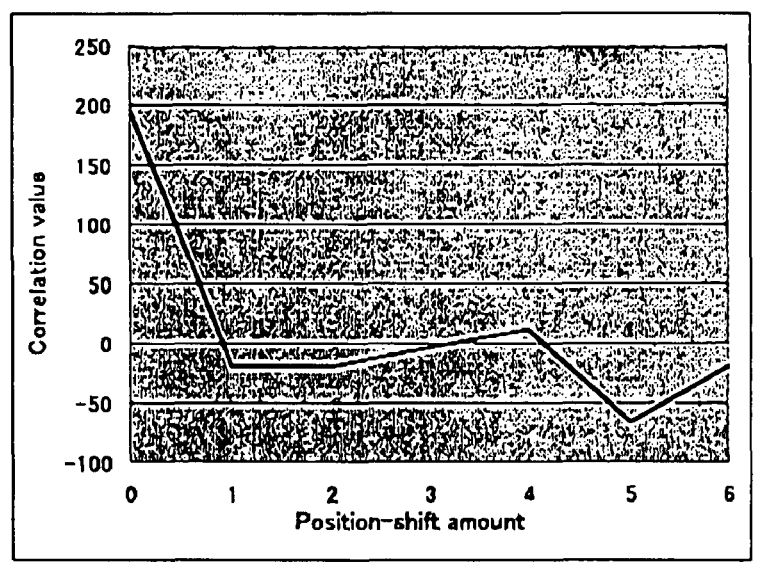
[FIG. 12]
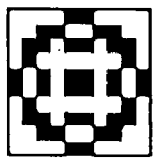
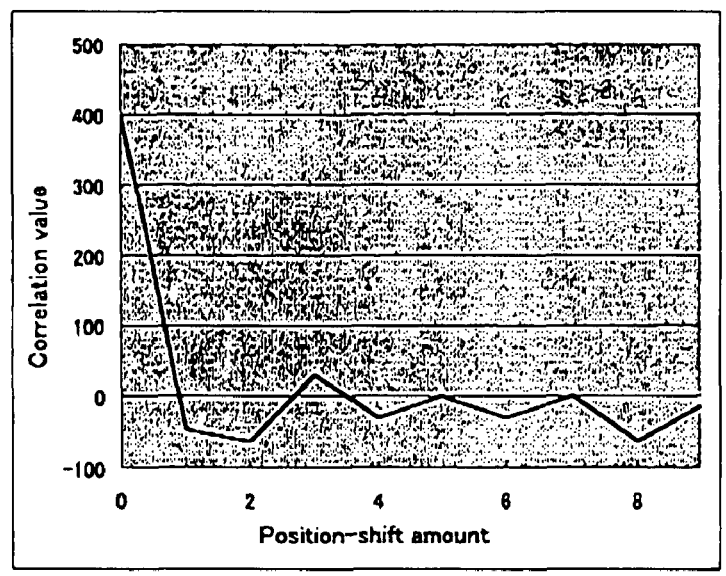

[FIG. 13]
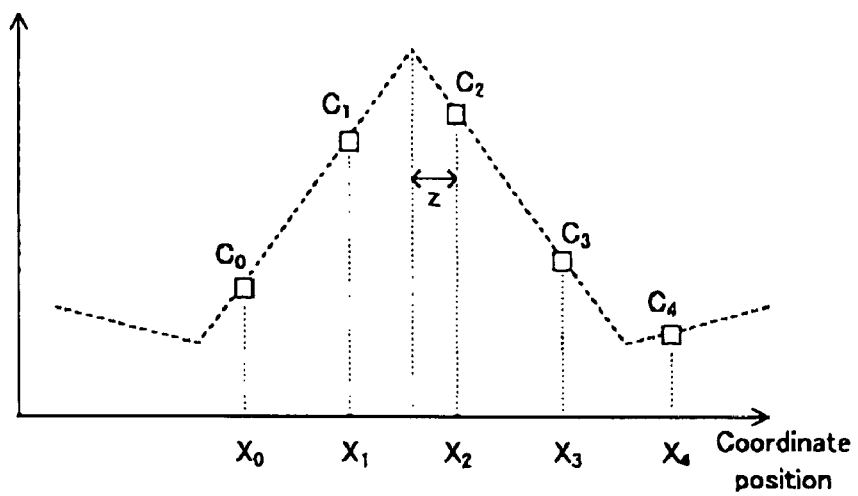
(a)
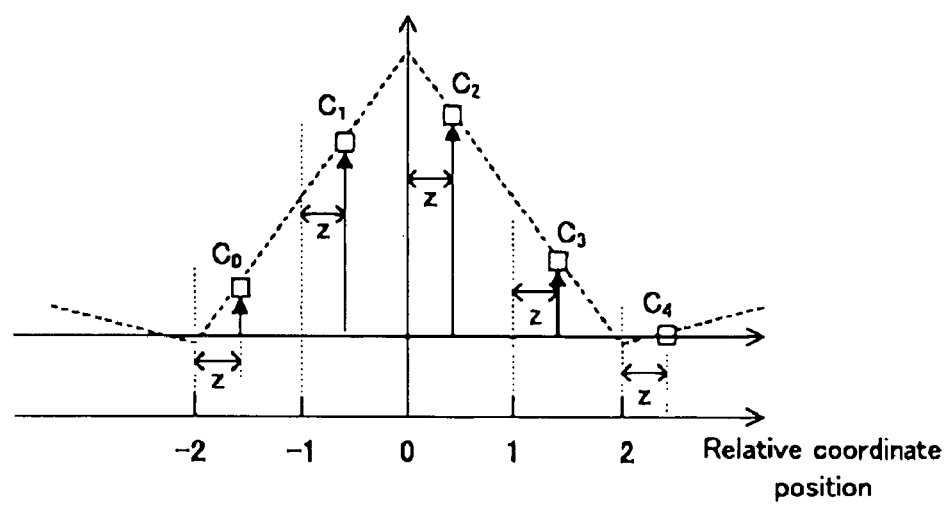
(b)

[FIG. 14]
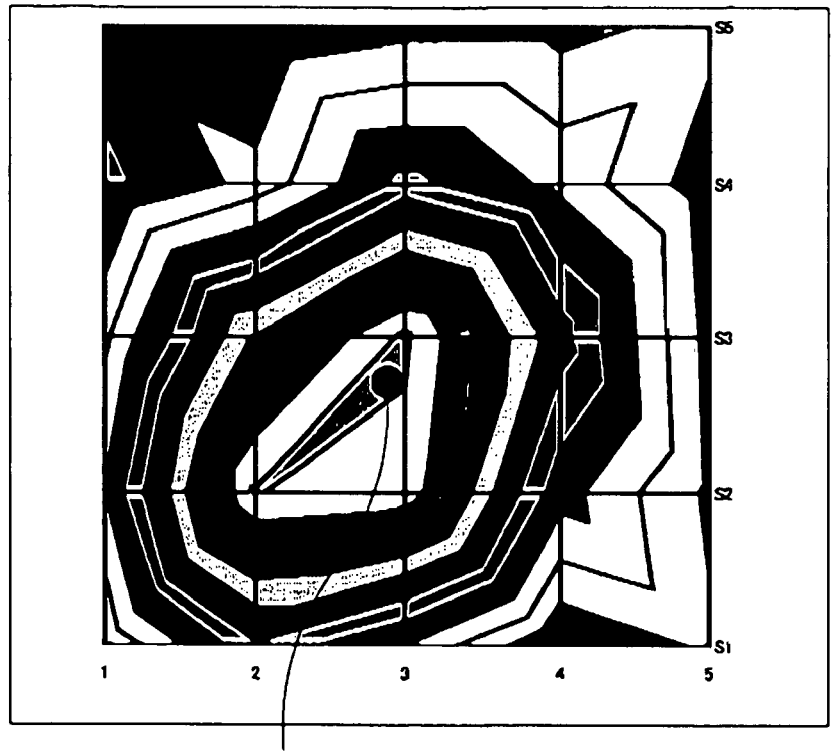
Center of gravity
[FIG. 15]
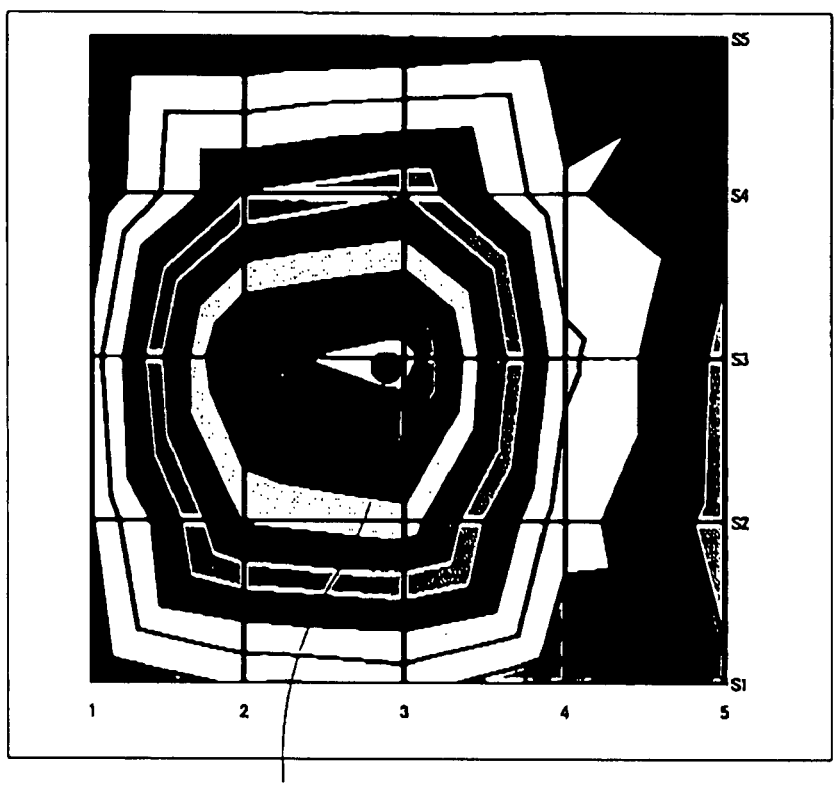
Center of gravity

[FIG. 16]

|     |     |     |     |     |
| --- | --- | --- | --- | --- |
| $C_{00}$ | $C_{01}$ | $C_{02}$ | $C_{03}$ | $C_{04}$ |
| $C_{10}$ | $C_{11}$ | $C_{12}$ | $C_{13}$ | $C_{14}$ |
| $C_{20}$ | $C_{21}$ | $C_{22}$ | $C_{23}$ | $C_{24}$ |
| $C_{30}$ | $C_{31}$ | $C_{32}$ | $C_{33}$ | $C_{34}$ |
| $C_{40}$ | $C_{41}$ | $C_{42}$ | $C_{43}$ | $C_{44}$ |

TEMPLATE MATCHING PROCESSING APPARATUS AND METHOD, HOLOGRAM REPRODUCING APPARATUS AND METHOD, AND COMPUTER PROGRAM

This application is the U.S. national phase of International Application No. PCT/JP2006/304056 filed 3 Mar. 2006, which designated the U.S. and claims priority to JP 2005-059464 filed 3 Mar. 2005, the entire contents of each of which are hereby incorporated by reference.

TECHNICAL FIELD

The present invention relates to a template matching processing apparatus for and method of performing template matching process in image processing, a hologram reproducing apparatus for and method of reproducing information from a holographic recording medium, and a computer program used for the template matching processing apparatus and the hologram reproducing apparatus described above.

BACKGROUND ART

Nowadays, as template matching process, there is known a processing method in which a correlation value between the template image and the detection image is calculated in each position while a template image is shifted by one pixel each time throughout an entire candidate area in a detection image, to thereby obtain a coordinate position at which the correlation value has the maximum value. The template matching process is performed in obtaining the position of an image in image processing and specifically, for example, in reproducing data by using a hologram reproducing technique. In the template matching process, the position or position-shift can be obtained by a pixel unit of the detection image.

On the other hand, there have been attempts to further improve the accuracy of the template matching process. For example, a patent document 1 discloses a technology in which a multivariate polynomial regression surface is used to obtain the position of the detection image by a sub-pixel unit. Moreover, a patent document 2 discloses a technology in which a difference or inclination (or slope) between the maximum value of the correlation values and the correlation value(s) around the position of the maximum value is used to obtain the position of the detection image by the sub-pixel unit. A patent document 3 discloses a technology in which the correlation value between pixels is complemented by a linear equation or curve equation on the basis of a positional relationship between the maximum value of the correlation values and the correlation value(s) around the position of the maximum value, to thereby obtain the position of the detection image by the sub-pixel unit.

Patent document 1: Japanese Patent Application Laid Open NO. Hei 5-120436
Patent document 2: Japanese Patent Application Laid Open NO. Hei 10-124666
Patent document 3: Japanese Patent Application Laid Open NO 2001-195597

DISCLOSURE OF INVENTION

Subject to be Solved by the Invention

These techniques, however, have such technical problems that the more attempts are made to improve the accuracy of the template matching process, the more complicate operation (calculation) is needed, which is not practical or which costs more.

The subject to be solved by the invention includes the aforementioned problem as one example. It is therefore an object of the present invention to provide a template matching processing apparatus and method which do not need a complicate operation (calculation) while improving the accuracy of the template matching process, a hologram reproducing apparatus and method provided with such a template matching processing apparatus, and a computer program which makes a computer execute as the template matching processing apparatus and the hologram reproducing apparatus.

Means for Solving the Subject (Template Matching Processing Apparatus)

The above object of the present invention can be achieved by a template matching processing apparatus provided with: a first calculating device for calculating a plurality of correlation values, each of which indicates a correlation between an inputted detection image and a predetermined template image, by a pixel unit while shifting the template image by the pixel unit with respect to the detection image; and a second calculating device for calculating a coordinate position of the detection image on the basis of a coordinate position of a center of gravity of the plurality of correlation values (i.e. the center of gravity with the correlation value being as weight).

According to the template matching processing apparatus of the present invention, the correlation value between the inputted detection image and the predetermined template image is calculated by the operation of the first calculating device. At this time, the correlation value is calculated while the template image which is a comparison target is shifted by the pixel unit. That is, the plurality of correlation values are calculated in accordance with the number of times to shift the template image. If an image which is the same as or similar to the template image is included in one pixel position in the detection image, the correlation value at the one pixel position is relatively large. On the other hand, if the image which is the same as or similar to the template image is not included in another pixel position in the detection image, the correlation value at the another pixel position is relatively small.

In particular, in the present invention, the coordinate position of the detection image is calculated by the operation of the second calculating device on the basis of the coordinate position of the center of gravity of the plurality of correlation values, which are calculated by the first calculating device. Specifically, at the coordinate position of the center of gravity, the detection image and the template image have the highest correlation. That is, the position of a marker, which is appended in advance in the detection image as a reference of the position of the detection image, becomes clear on the basis of the coordinate position of the center of gravity, and thus the coordinate position of the detection image is calculated. The coordinate position of the detection image may be directly calculated, for example, as the coordinate on a predetermined plane or space. Alternatively, the coordinate position of the detection image may be indirectly calculated, for example, as a position-shift amount of the detection image from a reference position.

In this case, the coordinate position of the center of gravity is calculated by a sub-pixel unit, which is finer than the pixel unit (or picture cell unit) which is resolution when the correlation values are actually calculated. This is because the template matching processing apparatus of the present invention calculates the coordinate position of the detection image not by using only the actually calculated correlation values but by using the center of gravity of the correlation values, which are obtained from the actually calculated correlation values. In other words, this is because the center of gravity which can be located in a gap of the correlation values calculated by the pixel unit is used to calculate the coordinate position of the detection image. This allows the template matching processing apparatus of the present invention to calculate the coordinate position of the detection image by the sub-pixel unit.

In addition, the center of gravity can be calculated by a relatively simple operation (e.g. such a simple operation that uses the correlation values calculated by the first calculating device and the pixel position when the correlation values are calculated, or the like). Therefore, there is also such an advantage that it is unnecessary to perform a complicate calculation. In short, there are two great advantages that the coordinate position of the detection image can be calculated highly accurately and that a processing load required for the calculation can be reduced.

In one aspect of the template matching processing apparatus of the present invention, the first calculating device calculates the plurality of correlation values while two-dimensionally shifting the template image in a longitudinal direction and a lateral direction by the pixel unit.

According to this aspect, the template image is shifted not simply one-dimensionally in one direction but two-dimensionally along the image surface of the detection image. Therefore, it is possible to calculate the plurality of correlation values which are distributed two-dimensionally. As a result, the center of gravity of the correlation values can be obtained more accurately. This allows the coordinate position of the detection image to be calculated more highly accurately.

In another aspect of the template matching processing apparatus of the present invention, the second calculating device subtracts a minimum value of a curve or a curved surface, which includes the plurality of correlation values calculated by the first calculating device, from each of the plurality of correlation values and then calculates the coordinate position of the detection image on the basis of the coordinate position of the center of gravity of the plurality of correlation values from each of which the minimum value is subtracted.

According to this aspect, after the minimum value of the curve or the curved surface, which includes the plurality of correlation values (i.e. the minimum value of the correlation values which is predicted from a distribution of the correlation values calculated by the first calculating device) is subtracted from each of the plurality of correlation values, the center of gravity is obtained. The subtraction process allows more accurate calculation of the position at which the correlation value is maximal by a relatively easy calculation, resulting in a more highly accurate coordinate position of the detection image.

In another aspect of the template matching processing apparatus of the present invention, the second calculating device subtracts a minimum value of the plurality of correlation values, which are calculated by the first calculating device, from each of the plurality of correlation values and then calculates the coordinate position of the detection image on the basis of the coordinate position of the center of gravity of the plurality of correlation values from each of which the minimum value is subtracted.

According to this aspect, after the actual minimum value of the plurality of correlation values, which are calculated by the first calculating device, is subtracted from each of the plurality of correlation values, the center of gravity is obtained. The subtraction process allows more accurate calculation of the position at which the correlation value is maximal by a relatively easy calculation, resulting in a more highly accurate coordinate position of the detection image.

In another aspect of the template matching processing apparatus of the present invention, the second calculating device subtracts an average value of relatively small n correlation values (wherein n is an integer of 2 or more) of the plurality of correlation values, which are calculated by the first calculating device, from each of the plurality of correlation values and then calculates the coordinate position of the detection image on the basis of the coordinate position of the center of gravity of the plurality of correlation values from each of which the average value is subtracted. The subtraction process allows more accurate calculation of the position at which the correlation value is maximal by a relatively easy calculation, resulting in a more highly accurate coordinate position of the detection image.

In another aspect of the template matching processing apparatus of the present invention, the second calculating device calculates the coordinate position of the detection image on the basis of a coordinate position corresponding to a maximum value of the plurality of correlation values and the coordinate position of the center of gravity of the plurality of correlation values.

According to this aspect, it is possible to calculate the coordinate position of the detection image, more highly accurately.

In another aspect of the template matching processing apparatus of the present invention, the first calculating device calculates the plurality of correlation values by each of the pixel units which are distributed in a matrix.

According to this aspect, it is possible to calculate the plurality of correlation values which are distributed in the matrix. This results in more accurate calculation of the position at which the correlation value is maximal, and this allows a more highly accurate coordinate position of the detection image.

In an aspect of the template matching processing apparatus in which the plurality of correlation values are calculated by each of the pixel units which are distributed in the matrix, as described above, it may be constructed such that the template matching processing apparatus is further provided with a judging device for judging a magnitude-relation between two correlation values which are adjacent to a maximum value of the plurality of correlation values in a column direction and magnitude-relation between two correlation values which are adjacent to the maximum value in a row direction, and that the second calculating device subtracts an average value of correlation values in an edge portion on the side on which correlation value judged to be small by the judging device is located, out of the correlation values in each column or row of the pixel units which are distributed in the matrix, from each of the plurality of correlation values and then calculates the coordinate position of the detection image on the basis of the coordinate position of the center of gravity of the plurality of correlation values from each of which the average value is subtracted.

By virtue of such construction, the magnitude-relation between the two correlation values adjacent to the maximum value of the plurality of correlation values is judged by the column or row of the pixel units, by the operation of the judging device. On the basis of the judgment of the magnitude-relation, the correlation values in the end portion on the side on which the smaller correlation value is located are extracted by the column or row of the pixel units. For example, if one column is composed of five pixel units and if the correlation value related to the third pixel unit is maximal, the magnitude-relation between the correlation value related to the second pixel unit and the correlation value related to the fourth pixel unit is judged. If it is judged that the correlation value related to the fourth pixel unit is smaller than the correlation value related to the second pixel unit, the correlation value related to the fifth pixel unit is extracted as the correlation value in the end portion.

As described above, after the average value of the plurality of correlation values in the end portion, which are extracted by the column or row of the pixel units, is subtracted from each of the plurality of correlation values, the center of gravity is obtained. The subtraction process allows more accurate calculation of the position at which the correlation value is maximal, resulting in a more highly accurate coordinate position of the detection image.

In an aspect of the template matching processing apparatus provided with the judging device, as described above, the first calculating device may calculate the plurality of correlation values by using the template image in which a distribution of the correlation values near the edge portion is substantially flat.

By virtue of such construction, the correlation values near the end portion are substantially the same, and as a result, it is possible to equate the correlation values in the end portion with the minimum value of the plurality of correlation values. Therefore, it is possible to further simplify the operation when the center of gravity is obtained, to thereby calculate the coordinate position of the detection image, more easily.

(Template Matching Processing Method)

The above object of the present invention can be also achieved by a template matching processing method provided with: a first calculating process of calculating a plurality of correlation values, each of which indicates a correlation between an inputted detection image and a predetermined template image, by a pixel unit while shifting the template image by the pixel unit with respect to the detection image; and a second calculating process of calculating a coordinate position of the detection image on the basis of a coordinate position of a center of gravity of the plurality of correlation values.

According to the template matching processing method of the present invention, it is possible to receive the same various benefits as those of the aforementioned template matching processing apparatus of the present invention.

Incidentally, in response to the various aspects of the aforementioned template matching processing apparatus of the present invention, the template matching processing method of the present invention can also adopt various aspects.

(Hologram Reproducing Apparatus)

The above object of the present invention can be also achieved by a hologram reproducing apparatus for reproducing record information from a holographic recording medium on which an interference pattern is recorded, the interference pattern being formed from reference light and object light corresponding to the record information, the hologram reproducing apparatus provided with: an image obtaining device for obtaining a detection image including the record information, on the basis of detection light generated by irradiation of the reference light; a first calculating device for calculating a plurality of correlation values, each of which indicates a correlation between the detection image and a predetermined template image, by a pixel unit while shifting the template image by the pixel unit with respect to the detection image; a second calculating device for calculating a coordinate position of the detection image on the basis of a coordinate position of a center of gravity of the plurality of correlation values; a correcting device for correcting at least one of a distortion and a position-shift of the detection image on the basis of the coordinate position of the detection image, which is calculated by the second calculating device; and a reproducing device for reproducing the record information included in the detection image in which at least one of the distortion and the position-shift is corrected.

According to the hologram reproducing apparatus of the present invention, the holographic recording medium is irradiated with the reference light to thereby obtain the detection light. Then, on the basis of the detection light, the detection image including the record information is obtained by the operation of the image obtaining device.

In particular, in the present invention, the template matching process is performed with respect to the detection image by the operation of the aforementioned template matching processing apparatus of the present invention i.e. the first calculating device and the second calculating device). After that, on the basis of the coordinate position of the detection image, the distortion, position-shift, or the like of the detection image is corrected. Then, by the operation of the reproducing device, demodulation or decoding or the like is performed with respect to the corrected detection image to thereby reproduce the record information.

Therefore, as in the aforementioned template matching processing apparatus of the present invention, it is possible to calculate the coordinate position of the detection image highly accurately at a relatively low processing load, to thereby preferably reproduce the record information recorded in the holographic recording medium.

(Hologram Reproducing Method)

The above object of the present invention can be also achieved by a hologram reproducing method of reproducing record information from a holographic recording medium on which an interference pattern is recorded, the interference pattern being formed from reference light and object light corresponding to the record information, the hologram reproducing method provided with: an image obtaining process of obtaining a detection image including the record information, on the basis of detection light generated by irradiation of the reference light; a first calculating process of calculating a plurality of correlation values, each of which indicates a correlation between the detection image and a predetermined template image, by a pixel unit while shifting the template image by the pixel unit with respect to the detection image; a second calculating process of calculating a coordinate position of the detection image on the basis of a coordinate position of a center of gravity of the plurality of correlation values; a correcting process of correcting at least one of a distortion and a position-shift of the detection image on the basis of the coordinate position of the detection image, which is calculated by the second calculating device; and a reproducing process of reproducing the record information included in the detection image in which at least one of the distortion and the position-shift is corrected.

According to the hologram reproducing method of the present invention, it is possible to receive the same various benefits as those of the aforementioned hologram reproducing apparatus of the present invention.

Incidentally, in response to the various aspects of the aforementioned hologram reproducing apparatus of the present invention, the hologram reproducing method of the present invention can also adopt various aspects.

(Computer Program)

The above object of the present invention can be also achieved by a first computer program for hologram reproduction control to control a computer provided in the aforementioned template matching processing apparatus of the present invention (including its various aspects), the computer program making the computer function as at least one portion of the first calculating device and the second calculating device. The above object of the present invention can be also achieved by a second computer program for hologram reproduction control to control a computer provided in the aforementioned hologram reproducing apparatus of the present invention (including its various aspects), the computer program making the computer function as at least one portion of the image obtaining device, the first calculating device, the second calculating device, the correcting device, and the reproducing device.

According to each of the computer programs of the present invention, the aforementioned template matching processing apparatus or hologram reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the aforementioned template matching processing apparatus or hologram reproducing apparatus of the present invention, each of the computer programs of the present invention can also adopt various aspects.

The above object of the present invention can be also achieved by a first computer program product in a computer-readable medium for tangibly embodying a program of instructions executable by a computer provided in the aforementioned template matching processing apparatus of the present invention (including its various aspects), the computer program product making the computer function as at least one portion of the first calculating device and the second calculating device. The above object of the present invention can be also achieved by a second computer program product in a computer-readable medium for tangibly embodying a program of instructions executable by a computer provided in the aforementioned hologram reproducing apparatus of the present invention (including its various aspects), the computer program product making the computer function as at least one portion of the image obtaining device, the first calculating device, the second calculating device, the correcting device, and the reproducing device.

According to each of the computer program products of the present invention, the aforementioned template matching processing apparatus or hologram reproducing apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned template matching processing apparatus or hologram reproducing apparatus of the present invention.

These effects and other advantages of the present invention will become more apparent from the embodiment explained below.

As explained above, according to the template matching processing apparatus of the present invention, it is provided with the first calculating device and the second calculating device. According to the template matching processing method of the present invention, it is provided with the first calculating process and the second calculating process. Moreover, according to the hologram reproducing apparatus of the present invention, it is provided with the image obtaining device, the first calculating device, the second calculating device, the correcting device, and the reproducing device. According to the hologram reproducing method of the present invention, it is provided with the image obtaining process, the first calculating process, the second calculating process, the correcting process, and the reproducing process. Therefore, it is possible to improve the accuracy of the template matching process, and a complicate operation is unnecessary.

BRIEF DESCRIPTION OF DRAWINGS

FIG. 1 is a view showing the structure of an optical system of a hologram recording/reproducing apparatus in an embodiment of the present invention.

FIG. 2 are views showing one example of a 2-dimensional digital modulation method of modulating record data.

FIG. 3 is a block diagram showing the outline structure of a signal processing system of the hologram recording/reproducing apparatus in the first embodiment of the present invention.

FIG. 4 are timing charts conceptually describing a signal waveform when the record data is reproduced and its timing in association with an imaging sensor in a pickup.

FIG. 5 is a view showing an example of a spatial modulation image pattern including markers.

FIG. 6 is a flowchart conceptually showing a flow of template matching process in the embodiment.

FIG. 7 is a plan view conceptually showing a relationship between a template image and a reproduction image when a correlation value is calculated.

FIG. 8 is a graph conceptually showing one example of a distribution of the calculated correlation values.

FIG. 9 is one explanatory diagram in which the correlation values two-dimensionally calculated are arranged in a matrix.

FIG. 10 is another explanatory diagram in which the correlation values two-dimensionally calculated are arranged in a matrix.

FIG. 11 is a plan view conceptually showing one shape of the marker and a graph conceptually showing a distribution aspect of the correlation value when the marker is used.

FIG. 12 is a plan view conceptually showing another shape of the marker and a graph conceptually showing a distribution aspect of the correlation value when the marker is used.

FIG. 13 are graphs conceptually showing one example of the distribution of the correlation values.

FIG. 14 is a contour plot conceptually showing one aspect of a three-dimensional distribution of the correlation values.

FIG. 15 is a contour plot conceptually showing another aspect of the three-dimensional distribution of the correlation values.

FIG. 16 is an explanatory diagram conceptually showing another example when a reference value is calculated.

DESCRIPTION OF REFERENCE CODES

11 recording/reproducing laser
16 two-dimensional sensor
44 position detection circuit
441 correlation-value calculation device 442 center-of-gravity calculation device
443 image-position calculation device

BEST MODE FOR CARRYING OUT THE INVENTION

Hereinafter, the best mode for carrying out the present invention will be explained in each embodiment in order with reference to the drawings. Incidentally, in the embodiment below, an explanation will be given by using an embodiment of a hologram recording/reproducing apparatus provided with the template matching processing apparatus of the present invention.

(1) Basic Structure and Basic Operation Principle

Firstly, with reference to FIG. 1 to FIG. 4, the basic structure and the basic operation principle of the hologram recording/reproducing apparatus in this embodiment will be explained. FIG. 1 shows the structure of an optical system disposed in a pickup of the hologram recording/reproducing apparatus in the embodiment. FIG. 2 show one example of a 2-dimensional (or 2D) digital modulation method of modulating record data. FIG. 3 is a block diagram showing the outline structure of a signal processing system of the hologram recording/reproducing apparatus in the embodiment. FIG. 4 are timing charts conceptually describing a signal waveform when the record data is reproduced and its timing in association with an imaging sensor in the pickup.

As shown in FIG. 1, a pickup 10 is provided with a recording/reproduction laser 11 which generates laser light for data recording and reproduction.

In the recording, a light beam Lo emitted from the recording/reproduction laser 11 is inputted to a spatial modulator 14, with its beam diameter expanded by a beam expander, which is formed of lenses 12 and 13. The spatial modulator 14 can be formed of, for example, a liquid crystal element, and it has a plurality of pixels arranged in a lattice pattern.

The spatial modulator 14 displays a pattern made of a white pixel and a black pixel, which is obtained by 2D-digital modulating input data to be recorded, and it spatial-modulates the light beam in accordance with the pattern.

FIG. 2 show one example of the 2D digital modulation performed by the spatial modulator 14. In this example, as shown in FIG. 2(a), the digital input data, i.e., "0" and "1" in the input data to be recorded into a recording medium 1 are expressed by the combination of the white pixel and the black pixel. The vertical arrangement of the white pixel and the black pixel in this order corresponds to the input data "0", and the vertical arrangement of the black pixel and the white pixel in this order corresponds to the input data "1". This example is referred to as 1:2 difference modulation because 1-bit input data is converted to 2-bit (2-pixel) 2D modulation data.

FIG. 2(b) shows the 2D modulation data, which is obtained by 2D digital-modulating input data of "00101101" in this modulation method, as output modulation data. That is, a modulation image pattern made of the white pixel and the black pixel is displayed on the spatial modulator 14, as the output modulation data. The light beam Lo which enters the spatial modulator 14 is transmitted through the white pixel portion of the spatial modulation image pattern and is blocked in the black pixel portion of the spatial modulation image pattern. Thus, the light beam Lo optically modulated by the spatial modulation image pattern is emitted from the spatial modulator 14. Incidentally, the aforementioned example is one example of the spatial-modulation, and the application of the present invention is not necessarily limited to the aforementioned modulation method. For example, like a so-called 2:4 modulation method, which converts 2-bit input data to 4-bit 2D modulation data, any 2D digital modulation method may be used if capable of converting the input data to the 2D modulation image pattern and if capable of driving the spatial modulator to spatial-modulating a beam or luminous flux.

In FIG. 1 again, the light beam Lo spatial-modulated by the spatial modulator 14 passes through a half mirror 15 and is focused by an objective lens 18 to thereby being irradiated onto the holographic recording medium 1.

On the rear of the recording medium 1 (on the opposite side to the objective lens 18), there is provided a mirror 19. The light beam Lo focused by the objective lens 18 passes through the recording medium 1, is reflected by the mirror 19, and then enters the recording medium again. Therefore, the light beam which enters the medium directly from the objective lens 18 and the light beam which enters the medium after being reflected by the mirror 19 form an interference pattern in the recording medium 1. The interference pattern is recorded into the recording medium 100.

The light beam Lo which enters the recording medium 1 after being reflected by the mirror 19 is reflected by the half mirror 15 and is received by a 2D sensor 16. The 2D sensor 16 may be a CCD array, a CMOS sensor, or the like, and it outputs an electrical signal corresponding to the quantity of incident light.

On the other hand, in the information reproduction, the spatial modulator 14 is controlled in a non-modulation condition i.e. all-optical transmission condition). Thus, the light beam Lo emitted from the recording/reproduction laser 11 passes through the half mirror 15 and the objective lens 18, without being modulated by the spatial modulator 14, and it is irradiated onto the recording medium 1. The light becomes reference light for reproduction. In the recording medium 1, the reference light for reproduction and the interference pattern recorded in the recording medium 1 generate detection light. The detection light passes through the objective lens 18, is reflected by the half mirror 15, and enters the 2D sensor 16. In this manner, the spatial modulation image pattern with the white and black pixels, generated by the spatial modulator 14 in the recording, is formed on the 2D sensor 16. The spatial modulation image pattern is detected to obtain reproduction data corresponding to the recorded input data.

Next, a signal processing system of the hologram recording/reproducing apparatus in the embodiment will be explained.

As shown in FIG. 3, the hologram recording/reproducing apparatus is provided with: a reproduction image memory 41; a distortion correction circuit 42; a decoding circuit 43; and a position detection circuit 44.

The reproduction image memory 41 temporarily stores output data (i.e. reproduction image) outputted from the 2D sensor 16 disposed in the optical pickup 10. Specifically, the reproduction image memory 41 stores a reproduction image which is generated from the returned light beam of the light beam Lo which is irradiated onto the disc-shaped recording medium 1 whose rotation is controlled by a spindle motor 8. The reproduction image memory 41 also outputs the stored reproduction image pattern to each of the distortion correction circuit 42 and the position detection circuit 44.

The distortion correction circuit 42 performs distortion correction with respect to the reproduction image pattern, which is outputted from the reproduction image memory 41, on the basis of a position-shift amount of the reproduction image pattern, which is outputted from the position detection circuit 44. As a result, it specifies one page of the record data.

At this time, the distortion correction circuit 42 performs, for example, geometric correction as one specific example of the distortion correction. The geometric correction means correcting a shift in pixel position between the data recording and the data reproduction. The image pattern is transcribed through the optical system from the spatial modulator 14 to the recording medium 1 in the recording, and from the recording medium 1 to the 2D sensor 16 in the reproduction. Since there arises a difference in magnification and distortion of the optical system, medium contraction and the like in the recording and the reproduction, it is hardly possible to completely match the pixel position on the spatial modulator 14 in the recording and the pixel position on the 2D sensor 16 in the reproduction. Thus, the geometric correction is performed by each page of the record data. More specifically, on the basis of the shift between an original marker position on the spatial modulator 14 and a marker position detected in the reproduction image pattern, the distortion correction circuit 42 corrects each pixel position included in the reproduction image pattern.

For example, if the pixel position on the spatial modulator 14 in the recording and the pixel position (i.e. the position of each light receiving element) on the 2D sensor 16 in the reproduction do not match as shown in FIG. 4(*a*), detection light which is to enter a particular pixel on the 2D sensor 16 possibly enters another pixel on the 2D sensor 16. More specifically, detection light which is originally to enter a first light receiving element (or first pixel) and a third light receiving element (or third pixel) on the 2D sensor 16 possibly enters each of a 0 light receiving element and a second light receiving element on the 2D sensor 16. In other words, there possibly arises a position-shift by a pixel unit. As a result, the output of the 2D sensor is not binary data to be originally expected. This makes it difficult to preferably demodulate or decode the detection light to the original record data.

Alternatively, for example, if the pixel position on the spatial modulator 14 in the recording and the pixel position on the 2D sensor 16 in the reproduction do not match as shown in FIG. 4(*b*), the detection light which is originally to enter the first light receiving element and the third light receiving element on the 2D sensor 16 possibly enters either the first and second light receiving elements or the third and fourth light receiving elements on the 2D sensor 16. In other words, there possibly arises a position-shift by a sub-pixel unit. As a result, the output of the 2D sensor is not binary data to be originally expected but step-by-step multivalued data. This makes it difficult to demodulate or decode the detection light to the original record data. In order to prevent this type of situation, the distortion correction circuit 42 corrects each pixel position included in the reproduction image.

In FIG. 3 again, the decoding circuit 43 demodulates or decodes the reproduction image pattern on which the distortion correction is performed on the distortion correction circuit 42 and outputs it as the reproduction data. For example, the decoding circuit 43 demodulates or decodes the data in a demodulation method corresponding to the 2D-digital modulation method applied on the special modulator 14 in the recording and outputs the reproduction data corresponding to the record data. Incidentally, after that, the reproduction data is subjected to post-processing including error correction, deinterleaving, descrambling, or the like, and it is reproduced as the actual data.

The position detection circuit 44 detects the coordinate position of the reproduction image pattern (or the position-shift amount of the reproduction image, the distortion of the reproduction image, or the like), from the position of a marker included in the reproduction image. The coordinate position of the reproduction image pattern or the like is detected by template matching process, which will be described in detail later.

More specifically, the position detection circuit 44 is provided with: a correlation-value calculation device 441, which constitutes one specific example of the "first calculating device" of the present invention; a center-of-gravity calculation device 442, which constitutes one specific example of the "second calculating device" of the present invention; and a image-position calculation device 443, which constitutes one specific example of the "second calculating device" of the present invention. The details of the operation of each constitutional requirement will be explained later.

(2) Template Matching

Next, with reference to FIG. 5 to FIG. 13, the template matching process will be explained which is performed by the hologram recording/reproducing apparatus in the embodiment.

A record signal of a hologram memory allows the marker to be recorded in such a condition that the marker is appended to the spatial modulation image pattern, wherein the marker is a reference in position of the spatial modulation image pattern. The marker is information for identifying one unit (i.e. one page) of the record data recorded in the recording medium 1, and normally, it is constructed as an image portion having a predetermined shape.

Specifically, the marker is appended to the spatial modulation image pattern displayed on the spatial modulator 14. FIG. 5 shows an example of the spatial modulation image pattern including markers. In the example in FIG. 5, a spatial modulation image pattern 50 is displayed at a substantially center of the display area of the spatial modulator 14. Moreover, T-shape markers 52 are displayed on the outer side of the spatial modulation image pattern 50 and at the four corners of the display area of the spatial modulator 14. The spatial modulator 14 spatial-modulates the input data received from a not-illustrated record signal processing system in the aforementioned manner, to thereby generate the spatial modulation image pattern 50, and displays it in the display area of the spatial modulator 14, as shown in FIG. 5. Moreover, the spatial modulator 14 displays the predetermined markers 52 in the predetermined positions of the display area. In this manner, as schematically shown in FIG. 5, a display image pattern 54 including the spatial modulation image pattern 50 and the markers 52 is displayed in the display area of the spatial modulator 14.

In the data reproduction, the reproduction image pattern outputted from the 2D sensor 16 has a digital value corresponding to the display image pattern 54 displayed on the spatial modulator 14 in the recording. Thus, by the position detection device 44 detecting the marker position, one page of the record data is extracted. The marker position is detected by the matching between the reproduction image pattern and an image pattern which constitutes the marker (i.e. a template image described later).

Specifically, a flow of the template matching process in the embodiment will be explained with reference to FIG. 6 to FIG. 13. Incidentally, now, an explanation is given on an entire flow of the template matching process with reference to FIG. 6, and a more detailed explanation will be given, if necessary, with reference to FIG. 7 to FIG. 13. FIG. 6 is a flowchart conceptually showing the flow of the template matching process in the embodiment.

As shown in FIG. 6, firstly, the correlation value which indicates the correlation between the reproduction image pattern and the template image (i.e. the image which constitutes the marker) is calculated by the operation of the correlation-value calculation device 441 (step S101).

The calculation of the correlation value will be explained in more detail with reference to FIG. 7 to FIG. 10. FIG. 7 is a plan view conceptually showing a relationship between the template image and the reproduction image pattern when the correlation value is calculated. FIG. 8 is a graph conceptually showing one example of a distribution of the calculated correlation values. Each of FIG. 9 and FIG. 10 is an explanatory diagram in which the correlation values two-dimensionally calculated are arranged in a matrix.

As shown in FIG. 7, a reproduction image pattern 61 is an image pattern corresponding to the display image pattern 54 displayed on the spatial modulator 14 in the recording (wherein, for convenience of explanation, only the reproduction image pattern area is shown and the content of the reproduction image pattern itself is not shown). On the other hand, a template image 62 is an image pattern corresponding to the marker 52 used in the recording. When the correlation value between the reproduction image pattern 61 and the template image 62 is calculated, the template image 62 is displaced in an X direction and a Y direction on the reproduction image pattern 61 as shown in FIG. 7, to thereby calculate the correlation value of the reproduction image pattern 61 and the template image 62. As the calculated correlation value is larger, there is a higher possibility that the marker 52 is appended in that position.

For example, if the template image 62 is displaced in the X direction with the Y-direction position fixed, correlation values "$C_0$" to "$C_4$" discretely distributed are calculated as shown in FIG. 8. Specifically, the correlation value "$C_0$" is calculated when the template image 62 has an X-direction coordinate position of "$X_0$". The correlation value "$C_1$" is calculated when the template image 62 has an X-direction coordinate position of "$X_1$". The correlation value "$C_2$" is calculated when the template image 62 has an X-direction coordinate position of "$X_2$". The correlation value "$C_3$" is calculated when the template image 62 has an X-direction coordinate position of "$X_3$". Incidentally, in this case, the coordinate position of the template image 62 is coordinates (a, b) on the upper left of the template image 62, as shown in FIG. 7.

Incidentally, FIG. 8 shows a distribution aspect of the correlation value, which is predicted on the basis of the five correlation values "$C_0$" to "$C_4$", by using an alternate long and short dash line for reference. The maximum value of the correlation values, which are actually calculated by displacing the template image 62, is "$C_2$", but there can be a correlation value which is larger than "$C_2$" as is predicted from the graph in the alternate long and short dash line in FIG. 8. In the embodiment, as detailed later, the largest correlation value (or its position) in the distribution of the correlation values is calculated by using the correlation values actually calculated by displacing the template image 62.

Moreover, if the template image 62 is displaced in the Y direction, correlation values "$C_{00}$" to "$C_{22}$" two-dimensionally distributed are calculated as shown in FIG. 9. Specifically, the correlation value "$C_{00}$" is calculated when the template image 62 has a coordinate position of $(X_0, Y_0)$. The correlation value "$C_{01}$" is calculated when the template image 62 has a coordinate position of $(X_0, Y_1)$. The correlation value "$C_{02}$" is calculated when the template image 62 has a coordinate position of $(X_0, Y_2)$. The correlation value "$C_{10}$" is calculated when the template image 62 has a coordinate position of $(X_1, Y_0)$. The correlation value "$C_{11}$" is calculated when the template image 62 has a coordinate position of $(X_1, Y_1)$. The correlation value "$C_{12}$" is calculated when the template image 62 has a coordinate position of $(X_1, Y_2)$. The correlation value "$C_{20}$" is calculated when the template image 62 has a coordinate position of $(X_2, Y_0)$. The correlation value "$C_{21}$" is calculated when the template image 62 has a coordinate position of $(X_2, Y_1)$. The correlation value "$C_{22}$" is calculated when the template image 62 has a coordinate position of $(X_2, Y_2)$.

Alternatively, in case of oversampling in which one pixel of the reproduction image 61 is received by using 2×2=4 pixels of the 2D sensor 16, correlation values "$C_{00}$" to "$C_{44}$" distributed two-dimensionally and more finely are calculated as shown in FIG. 10.

In FIG. 6 again, next, a flat part of the correlation value is discriminated by the operation of the center-of-gravity calculation device 442 (step S102). Specifically, a flat section out of the distribution of the correlation values is discriminated. The judgment will be explained specifically by using FIG. 10.

It is assumed that "$C_{21}$" from among the correlation values "$C_{00}$" to "$C_{44}$" shown in FIG. 10 is maximal. At this time, the two correlation values adjacent to "$C_{22}$" are compared in each column and row of the matrix. Specifically, a magnitude-relation between the correlation values "$C_{21}$" and "$C_{23}$", which are the two adjacent values in the row direction, is judged. As a result of the judgment, if "$C_{21}$"<"$C_{23}$", it is judged that the flat part is the correlation values in the edge portion of the matrix on the side that "$C_{21}$" is located. That is, it is judged that the flat part is "$C_{00}$", "$C_{10}$", "$C_{20}$", "$C_{30}$", and "$C_{40}$", which are shown as a hatching portion in FIG. 10. On the other hand, if "$C_{21}$">"$C_{23}$", it is judged that the flat part is the correlation values in the edge portion of the matrix on the side that "$C_{23}$" is located. That is, it is judged that the flat part is "$C_{04}$", "$C_{14}$", "$C_{24}$", "$C_{34}$", and "$C_{44}$". Similarly, in the column direction, a magnitude-relation between the two correlation values "$C_{12}$" and "$C_{32}$" adjacent to "$C_{22}$" is judged. As a result of the judgment, if "$C_{12}$">"$C_{32}$", it is judged that the flat part is the correlation values in the edge portion of the matrix on the side that "$C_{32}$" is located. That is, it is judged that the flat part is "$C_{40}$", "$C_{41}$", "$C_{42}$", "$C_{43}$", and "$C_{44}$", which are shown as a hatching portion in FIG. 10. On the other hand, if "$C_{12}$"<"$C_{32}$", it is judged that the flat part is the correlation values in the edge portion of the matrix on the side that "$C_{12}$" is located. That is, it is judged that the flat part is "$C_{00}$", "$C_{01}$", "$C_{02}$", "$C_{03}$", and "$C_{04}$".

This uses such a property that the correlation value is extremely high in the portion out of the reproduction image pattern 61 at which the marker 52 is appended, but the correlation values are substantially the same in the other portion. In order to take advantage of the property more effectively, it is preferable to use the marker 52 having a shape which increases the correlation value extremely high in the portion out of the reproduction image pattern 61 at which the marker 52 is appended and which easily makes the correlation values substantially the same in the other portion. For example, the marker 52 is shown in FIG. 11 and FIG. 12 as one specific example. Each of FIG. 11 and FIG. 12 is a plan view showing the specific shape of the marker 52 and a graph conceptually showing a distribution aspect of the correlation value when the marker 52 is used.

If the marker 52 shown on the left side in each of FIG. 11 and FIG. 12 is used, the distribution of the correlation values is shown in a respective one of the graphs on the right side of FIG. 11 and FIG. 12. In the both graphs, the correlation value is extremely high in the portion out of the reproduction image pattern 61 at which the marker 52 is appended (i.e. the portion at which the position-shift amount is 0), but the correlation values are substantially the same in other portion. Therefore, using the marker 52 allows the template matching process in the embodiment to be preferably performed.

Incidentally, in the following explanation, the area that is judged to be the flat part is referred to as a surrounding area, and the other area is referred to as a center-of-gravity area.

In FIG. 6 again, next, a reference value B of the correlation values is calculated by the operation of the center-of-gravity calculation device 442 (step S103). As the reference value B, the average value of the correlation values in the surrounding area is listed as one specific example. For example, if it is judged that the hatching portion in FIG. 10 is the surrounding area, $B=(C_{00}+C_{10}+C_{20}+C_{30}+C_{40}+C_{41}+C_{42}+C_{43}+C_{44})/9$.

Then, the reference value B is subtracted from each of the plurality of correlation values in the center-of-gravity area by the operation of the center-of-gravity calculation device 442 to set the subtracted correlation value as a new correlation value (step S104). That is, "$C_{mn}$–B" is set as new "$C_{mn}$" (wherein m=0, 1, 2, 3, 4; n=0, 1, 2, 3, 4). In addition, the plurality of correlation values in the surrounding area is set to "0". Setting plurality of correlation values in the surrounding area to 0 enables the number of calculations shown below to be reduced, to thereby speed up the processing, which is preferable. Specifically, the calculation in the surrounding area is omitted.

After that, the center of gravity of the correlation values is calculated (step S105). Specifically, a coordinate position "$X_c$", in the X direction of the center of gravity (which is, in this case, a relative coordinate position based on the coordinate position of the maximum value of the calculation values actually calculated by displacing the template image 62) is expressed by an equation 1. A coordinate position "$Y_c$" in the Y direction of the center of gravity (which is, in this case, a relative coordinate position based on the coordinate position of the maximum value of the calculation values actually calculated by displacing the template image 62) is expressed by an equation 2.

$$X_c = \frac{\sum_{m=0}^{4}\sum_{n=0}^{4}(C_{mn} \times n)}{\sum_{m=0}^{4}\sum_{n=0}^{4}C_{mn}} - 2 \quad \text{[Equation 1]}$$

$$Y_c = \frac{\sum_{m=0}^{4}\sum_{n=0}^{4}(C_{mn} \times m)}{\sum_{m=0}^{4}\sum_{n=0}^{4}C_{mn}} - 2 \quad \text{[Equation 2]}$$

Here, the relative coordinates ($X_c$, $Y_c$) of the center of gravity are decimal coordinates. On the other hand, the coordinates of the maximum value of the plurality of correlation values which are already specified are integral coordinates. Then, the sum of the decimal coordinates and the integral coordinates is absolute position coordinates. The absolute position coordinates is a detection position with sub-pixel resolution at which the correlation value becomes maximum. In other words, it turns out that the marker 52 is appended in this coordinate position in the reproduction image pattern 61, and as a result, it is possible to calculate the coordinate position, distortion, position-shift, or the like of the reproduction image pattern 61 (step S106).

The center of gravity will be explained more specifically by using the graphs of the correlation value shown in FIG. 13. FIG. 13 are graphs conceptually showing one example of the distribution of the correlation values. Incidentally, in FIG. 13, for simplification of explanation, an explanation will be given under the assumption that the correlation values, which are originally distributed two-dimensionally, are distributed one dimensionally in the X direction. Of course, it is apparent that the same explanation applies in the Y direction.

As shown in FIG. 13(a), the maximum value of the correlation values actually calculated by displacing the template image 62 is "$C_2$", but there can be a correlation value "$C_{max}$" which is larger than "$C_2$" as is predicted from the graph in the dashed line in FIG. 13. That is, the coordinate position of "$C_{max}$" corresponds to the coordinate position of the marker 52 which is appended to the reproduction image pattern 61. The coordinate position of "$C_{max}$", however, is shifted by "z" from the coordinate position of the maximum value "$C_2$" of the coordinate values actually calculated by displacing the template image 62. This "z" corresponds to "X<" expressed by the aforementioned equation 1 and the aforementioned decimal coordinates.

In order to obtain this "z", such a property is used that the correlation values constitute an isosceles triangle with the center of gravity of the correlation values as the vertex.

Specifically, the graph of the correlation values shown in FIG. 13(a) can be rewritten to the graph shown in FIG. 13(b) when the center of gravity is displaced on the central axis. In this case, the coordinate position in the X direction is expressed as the relative coordinate position based on the coordinate position of the center of gravity. Since the coordinate position of each correlation value keeps one-pixel interval, the coordinate position of the correlation value "$C_0$" is "–2+z", the coordinate position of the correlation value "$C_1$" is "–1+z", the coordinate position of the correlation value "$C_2$" is "+z", the coordinate position of the correlation value "$C_3$" is "1+z", and the coordinate position of the correlation value "$C_4$" is "2+z", for example.

Here, the reference value B is "$C_4$", so "$C_4$" is subtracted from each correlation value and then the center of gravity of the correlation values is calculated. Specifically, moment $M_1$ on the left side of the center of gravity of the correlation values (i.e. on the side at which the relative coordinate position is negative) is expressed by $M_1=-(C_0-B)\times(-2+z)-(C_1-B)\times(-1+z)$, and moment $M_2$ on the right side of the center of gravity of the correlation values (i.e. on the side at which the relative coordinate position is positive) is $M_2=(C_2-B)\times_z-(C_3-B)(1+z)$. Since $M_1=M_2$, $-(C_0-B)\times(-2+z)-(C_1-B)\times(-1+z)=(C_2-B)\times_z-(C_3-B)(1+z)$. This is solved and $z=2(C_0+C_1-C_3-2B)/(C_0+C_1+C_2+C_3-4B)$ is derived. The same is true for the Y direction. Such a relation is applied to the two-dimensionally distributed correlation values, and the equation 1 and the equation 2 are derived.

In this case, the coordinate position of the center of gravity is calculated by the sub-pixel unit, which is finer than the pixel unit which is resolution when the correlation values are actually calculated. Specifically, this will be explained with reference to FIG. 14 and FIG. 15. Each of FIG. 14 and FIG. 15 is a contour plot conceptually showing an aspect of a three-dimensional distribution of the correlation values.

As shown in each of FIG. 14 and FIG. 15, the correlation value has a larger value as it is closer to the central part of the contour line map (i.e. inner contour line). In the embodiment, the top is obtained by calculating the center of gravity of the values of lattice points (i.e. sample points in a two-dimensional space) in each of FIG. 14 and FIG. 15. Using only the correlation values actually calculated by displacing the template image 62 allows the calculation of the coordinate position only by the lattice-point unit in each of FIG. 14 and FIG. 15. In the embodiment, however, it is possible to calculate the coordinate position of the center of gravity located between the lattice points, to thereby calculate the coordinate position by the sub-pixel unit. This allows the coordinate position of the reproduction image pattern 61 to be calculated more highly accurately. Therefore, it is possible to correct the distortion and position-shift of the reproduction image pattern

61, more highly accurately, to thereby demodulate or decode the reproduction image pattern 61 more preferably and further improve the reproduction quality of the record data.

In addition, the center of gravity can be calculated by a relatively simple operation (calculation). Therefore, there is also such an advantage that it is unnecessary to perform a complicate calculation, such as the calculation regarding the multivariate polynomial regression curve disclosed in the patent document 1. In short, there are two great advantages that the coordinate position of the reproduction image can be calculated highly accurately and that a processing load required for the calculation can be reduced.

In addition, the center of gravity is calculated after the reference value B is subtracted from each of the plurality of correlation values. Thus, it is only necessary to calculate the center of gravity in view of the correlation values in the center-of-gravity area in the matrix shown in FIG. 9 or FIG. 10. In other words, without considering the correlation values in the surrounding area, the center of gravity can be calculated preferably. As a result, it is further reduce the processing load required for the template matching process, to thereby speed up the processing.

Incidentally, in the aforementioned explanation, the reference value B is set as the average value of the correlation values in the surrounding area; however, the present invention is not limited to this. For example, as shown in a hatching portion in FIG. 16, the average value of the lower nine correlation values out of 25 correlation values may be set as the reference value B. Alternatively, the minimum value predicted from the distribution of the 25 correlation values may be set as the reference value B. Alternatively, the minimum value of the 25 correlation values may be set as the reference value B. Of course, another preferable value may be set as the reference value.

The present invention is not limited to the aforementioned embodiment, and various changes may be made without departing from the essence or spirit of the invention which can be read from the claims and the entire specification. A template matching processing apparatus and method, a hologram reproducing apparatus and method, and a computer program, which involve such changes, are also intended to be within the technical scope of the present invention.

INDUSTRIAL APPLICABILITY

The template matching processing apparatus and method, the hologram reproducing apparatus and method, and the computer program according to the present invention can be applied to a template matching processing apparatus for performing template matching process in image processing, and a hologram reproducing apparatus for reproducing information from a holographic recording medium. Moreover, they can be applied to the template matching processing apparatus, the hologram reproducing apparatus, or the like which is mounted on various computer equipment for consumer use or for commercial use, or which can be connected to various computer equipment.

The invention claimed is:

1. A template matching processing apparatus comprising:
a first calculating device for calculating a plurality of correlation values, each of which indicates a correlation between an inputted detection image and a predetermined template image, by a pixel unit while shifting the template image by the pixel unit with respect to the detection image, wherein said first calculating device calculates the plurality of correlation values by each of the pixel units which are distributed in a matrix;
a second calculating device for subtracting a predetermined reference value from each of the plurality of correlation values and then calculating a coordinate position of the detection image on the basis of a coordinate position of a center of gravity of the plurality of correlation values from each of which the reference value is subtracted; and
a judging device for judging a magnitude-relation between two correlation values which are adjacent to a maximum value of the plurality of correlation values in a column direction and magnitude-relation between two correlation values which are adjacent to the maximum value in a row direction, and
said second calculating device subtracts, as a reference value, an average value of correlation values in an edge portion on the side on which correlation value judged to be small by said judging device is located, out of the correlation values in each column or row of the pixel units which are distributed in the matrix, from each of the plurality of correlation values and then calculates the coordinate position of the detection image on the basis of the coordinate position of the center of gravity of the plurality of correlation values from each of which the average value is subtracted.

2. The template matching processing apparatus according to claim 1, wherein said first calculating device calculates the plurality of correlation values while two-dimensionally shifting the template image in a longitudinal direction and a lateral direction by the pixel unit.

3. The template matching processing apparatus according to claim 1, wherein said second calculating device subtracts, as the reference value, a minimum value of a curve or a curved surface, which includes the plurality of correlation values calculated by said first calculating device, from each of the plurality of correlation values and then calculates the coordinate position of the detection image on the basis of the coordinate position of the center of gravity of the plurality of correlation values from each of which the minimum value is subtracted.

4. The template matching processing apparatus according to claim 1, wherein said second calculating device subtracts, as the reference value, a minimum value of the plurality of correlation values, which are calculated by said first calculating device, from each of the plurality of correlation values and then calculates the coordinate position of the detection image on the basis of the coordinate position of the center of gravity of the plurality of correlation values from each of which the minimum value is subtracted.

5. The template matching processing apparatus according to claim 1, wherein said second calculating device subtracts, as the reference value, an average value of relatively small n correlation values (wherein n is an integer of 2 or more) of the plurality of correlation values, which are calculated by said first calculating device, from each of the plurality of correlation values and then calculates the coordinate position of the detection image on the basis of the coordinate position of the center of gravity of the correlation values from each of which the average value is subtracted.

6. The template matching processing apparatus according to claim 1, wherein said second calculating device calculates the coordinate position of the detection image on the basis of a coordinate position corresponding to a maximum value of the plurality of correlation values and the coordinate position of the center of gravity of the plurality of correlation values.

7. The template matching processing apparatus according to claim 1, wherein said first calculating device calculates the plurality of correlation values by using the template image in which a distribution of the correlation values near the edge portion is substantially flat.

8. A template matching processing method comprising:
a first calculating process of calculating a plurality of correlation values, each of which indicates a correlation between an inputting detection image and a predetermined template image, by a pixel unit while shifting the template image by the pixel unit with respect to the detection image, wherein said first calculating step calculates the plurality of correlation values by each of the pixel units which are distributed in a matrix;
a second calculating process of subtracting a predetermined reference value from each of the plurality of correlation values and then calculating a coordinate position of the detection image on the basis of a coordinate position of a center of gravity of the plurality of correlation values from each of which the reference value is subtracted; and
a judging process of judging a magnitude-relation between two correlation values which are adjacent to a maximum value of the plurality of correlation values in a column direction and magnitude-relation between two correlation values which are adjacent to the maximum value in a row direction, and
said second calculating process subtracts, as a reference value, an average value of correlation values in an edge portion on the side on which correlation value judged to be small by said judging device is located, out of the correlation values in each column or row of the pixel units which are distributed in the matrix, from each of the plurality of correlation values and then calculates the coordinate position of the detection image on the basis of the coordinate position of the center of gravity of the plurality of correlation values from each of which the average value is subtracted.

9. A hologram reproducing apparatus for reproducing record information from a holographic recording medium on which an interference pattern is recorded, the interference pattern being formed from reference light and object light corresponding to the record information,
said holograph reproducing apparatus comprising:
an image obtaining device for obtaining a detection image including the record information, on the basis of detection light generated by irradiation of the reference light;
a first calculating device for calculating a plurality of correlation values, each of which indicates a correlation between the detection image and a predetermined template image, by a pixel unit while shifting the template image by the pixel unit with respect to the detection image, wherein said first calculating device calculates the plurality of correlation values by each of the pixel units which are distributed in a matrix;
a second calculating device for subtracting a predetermined reference value from each of the plurality of correlation values and then calculating a coordinate position of the detection image on the basis of a coordinate position of a center of gravity of the plurality of correlation values from each of which the reference value is subtracted;
a judging device for judging a magnitude-relation between two correlation values which are adjacent to a maximum value of the plurality of correlation values in a column direction and magnitude-relation between two correlation values which are adjacent to the maximum value in a row direction,
said second calculating device subtracts, as a reference value, an average value of correlation values in an edge portion on the side on which correlation value judged to be small by said judging device is located, out of the correlation values in each column or row of the pixel units which are distributed in the matrix, from each of the plurality of correlation values and then calculates the coordinate position of the detection image on the basis of the coordinate position of the center of gravity of the plurality of correlation values from each of which the average value is subtracted;
a correcting device for correcting at least one of a distortion and a position-shift of the detection image on the basis of the coordinate position of the detection image, which is calculated by said second calculating device; and
a reproducing device for reproducing the record information included in the detection image in which at least one of the distortion and the position-shift is corrected.

10. A hologram reproducing method of reproducing record information from a holographic recording medium on which an interference pattern is recorded, the interference pattern being formed from reference light and object light corresponding to the record information,
said holograph reproducing method comprising:
an image obtaining process of obtaining a detection image including the record information, on the basis of detection light generated by irradiation of the reference light;
a first calculating process of calculating a plurality of correlation values, each of which indicates a correlation between the detection image and a predetermined template image, by a pixel unit while shifting the template image by the pixel unit with respect to the detection image, wherein said first calculating device calculates the plurality of correlation values by each of the pixel units which are distributed in a matrix;
a second calculating process of subtracting a predetermined reference value from each of the plurality of correlation values and then calculating a coordinate position of the detection image on the basis of a coordinate position of a center of gravity of the plurality of correlation values from each of which the reference value is subtracted;
a judging process of judging a magnitude-relation between two correlation values which are adjacent to a maximum value of the plurality of correlation values in a column direction and magnitude-relation between two correlation values which are adjacent to the maximum value in a row direction,
said second calculating process subtracts, as a reference value, an average value of correlation values in an edge portion on the side on which correlation value judged to be small by said judging device is located, out of the correlation values in each column or row of the pixel units which are distributed in the matrix, from each of the plurality of correlation values and then calculates the coordinate position of the detection image on the basis of the coordinate position of the center of gravity of the plurality of correlation values from each of which the average value is subtracted;
a correcting process of correcting at least one of a distortion and a position-shift of the detection image on the basis of the coordinate position of the detection image, which is calculated by said second calculating device; and
a reproducing process of reproducing the record information included in the detection image in which at least one of the distortion and the position-shift is corrected.

11. A computer program product in a non-transitory computer-readable medium for tangibly embodying a program of instructions executable by a computer provided in a template matching processing apparatus, the computer program making the computer function as at least one portion of a first calculating device and a second calculating device, said template matching processing apparatus comprising:

said first calculating device for calculating a plurality of correlation values, each of which indicates a correlation between an inputted detection image and a predetermined template image, by a pixel unit while shifting the template image by the pixel unit with respect to the detection image, wherein said first calculating device calculates the plurality of correlation values by each of the pixel units which are distributed in a matrix;

said second calculating device for subtracting a predetermined reference value from each of the plurality of correlation values and then calculating a coordinate position of the detection image on the basis of a coordinate position of a center of gravity of the plurality of correlation values from each of which the reference value is subtracted;

a judging device for judging a magnitude-relation between two correlation values which are adjacent to a maximum value of the plurality of correlation values in a column direction and magnitude-relation between two correlation values which are adjacent to the maximum value in a row direction, and said second calculating device subtracts, as a reference value, an average value of correlation values in an edge portion on the side on which correlation value judged to be small by said judging device is located, out of the correlation values in each column or row of the pixel units which are distributed in the matrix, from each of the plurality of correlation values and then calculates the coordinate position of the detection image on the basis of the coordinate position of the center of gravity of the plurality of correlation values from each of which the average value is subtracted.

12. A computer program product in a non-transitory computer-readable medium for tangibly embodying a program of instructions executable by a computer provided in a hologram reproducing apparatus, the computer program making the computer function as at least one portion of an image obtaining device, a first calculating device, a second calculating device, a correcting device, and a reproducing device, said hologram reproducing apparatus for reproducing record information from a holographic recording medium on which an interference pattern is recorded, the interference pattern being formed from reference light and object light corresponding to the record information, said hologram reproducing apparatus comprising:

said image obtaining device for obtaining a detection image including the record information, on the basis of detection light generated by irradiation of the reference light;

said first calculating device for calculating a plurality of correlation values, each of which indicates a correlation between the detection image and a predetermined template image, by a pixel unit while shifting the template image by the pixel unit with respect to the detection image, wherein said first calculating device calculates the plurality of correlation values by each of the pixel units which are distributed in a matrix;

said second calculating device for subtracting a predetermined reference value from each of the plurality of correlation values and then calculating a coordinate position of the detection image on the basis of a coordinate position of a center of gravity of the plurality of correlation values from each of which the reference value is subtracted;

a judging device for judging a magnitude-relation between two correlation values which are adjacent to a maximum value of the plurality of correlation values in a column direction and magnitude-relation between two correlation values which are adjacent to the maximum value in a row direction;

said second calculating process subtracts, as a reference value, an average value of correlation values in an edge portion on the side on which correlation value judged to be small by said judging device is located, out of the correlation values in each column or row of the pixel units which are distributed in the matrix, from each of the plurality of correlation values and then calculates the coordinate position of the detection image on the basis of the coordinate position of the center of gravity of the plurality of correlation values from each of which the average value is subtracted;

said correcting device for correcting at least one of a distortion and a position-shift of the detection image on the basis of the coordinate position of the detection image, which is calculated by said second calculating device; and a reproducing device for reproducing the record information included in the detection image in which at least one of the distortion and the position-shift is corrected.

* * * * *